United States Patent Office 3,519,700
Patented July 7, 1970

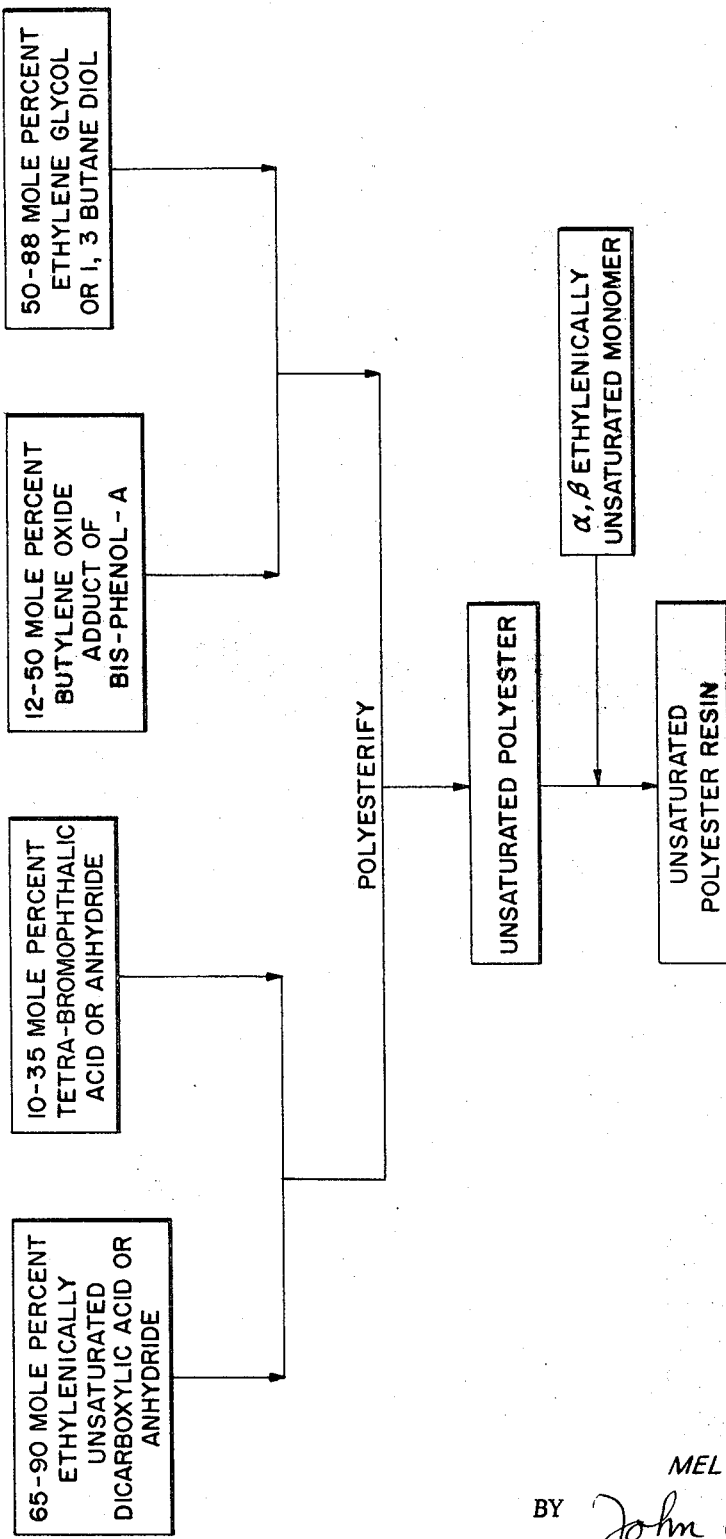

3,519,700
SELF-EXTINGUISHING POLYESTER RESIN
HAVING GOOD CHEMICAL RESISTANCE
Melvin E. Baum, Monroeville, Pa., assignor to Koppers
Company, Inc., a corporation of Delaware
Filed Nov. 24, 1967, Ser. No. 685,697
Int. Cl. C08f 21/02
U.S. Cl. 260—869               4 Claims

ABSTRACT OF THE DISCLOSURE

A self-extinguishing polyester resin having good chemical resistance comprises an $\alpha,\beta$-ethylenically unsaturated copolymerizable monomer and an unsaturated polyester produced by condensing approximately equi-molar proportions of 65–90 mole percent of an unsaturated dicarboxylic acid compound such as maleic acid, maleic anhydride and fumaric acid and 10–35 mole percent of tetrabromophthalic acid or its anhydride with 12–50 mole percent of a butylene oxide adduct of bis-phenol A and 50–88 mole percent of either ethylene glycol or 1,3-butane diol.

BACKGROUND OF THE INVENTION

The flammability of plastics is an important characteristic in many applications. Most plastic materials are flammable unless they have been modified by the addition of certain ingredients such as, for example, halogen-containing compounds which can also be used in conjunction with phosphorous compounds or antimony compounds. The flammability of thermosetting plastics, such as the polyester resin, is particularly important because one of the basic characteristics of such a resin is its stability at high temperatures. Therefore, such a plastic is more often used in high-temperature applications than are the so called thermoplastic materials; and thus, may be more often exposed to flammable conditions than a thermoplastic material. However, as is true in many other plastic materials, the addition of halogen compounds as inert ingredients to a polyester resin causes other problems in the utilization of the resin. The handling characteristics of the resin while being formed to a final product can be altered by such fillers; the strength of the resulting cured polyester resin can be reduced; its flexibility may be changed; it may have a lower heat distortion temperature; and its surface may be more easily penetrated. For these reasons, it has become a preferred practice to attempt to incorporate the fire-retardant or self-extinguishing agent chemically into the resin molecule. The most common approach to this is to substitute a chlorinated phthalic acid or its corresponding anhydride such as tetrachlorophthalic anhydride for the unchlorinated phthalic acid or anhydride normally used in a polyester resin. The chlorinated phthalic anhydride such as tetrachlorophthalic anhydride is then condensed with other diacids and dihydric alcohols to form a chlorinated polyester. However, it has been found that about 20–30% or more by weight of chlorine must be incorporated into these polyester resins in order to make them self-extinguishing. To provide this much chlorine, a large portion of the dicarboxylic acids must be chlorinated. This curtails the amount of other acids, such as maleic acid which can be used in such formulations and which are desirable to achieve specific properties. For these reasons, those skilled in the art have attempted to use bromine compounds instead of the above chlorine compounds because the amount of bromine necessary to render the polyester self-extinguishing is much lower than the corresponding amount of chlorine necessary. Therefore, less brominated dicarboxylic acid need be used. It has been proposed, therefore, to use tetrabromophthalic anhydride in the condensation reaction to form a self-extinguishing polyester resin.

However, while the use of this compound provides a halogen which is chemically bonded to the polyester, yet dissociates upon being subjected to flammable conditions to extinguish the resin, the use of any phthalic compounds in a polyester resin has a deleterious effect on the chemical resistance of the resin. In fact, most polyester resins which are at present marketed as having good chemical resistance contain no phthalic compounds. Rather all or most of the dicarboxylic acid or anhydride used is usually maleic or fumaric. Therefore, although it is desirable from the standpoint of producing a good self-extinguishing resin to use a brominated phthalic anhydride, the chemical resistance of such a resin when used with ordinary polyester ingredients is unsatisfactory. For example a self-extinguishing polyester resin made by condensing tetrabromophthalic anhydride and maleic anhydride with ethylene glycol or propylene glycol in a mole ratio of 1:1:2 has poor chemical resistance. It cannot be used in areas and applications where chemical resistance is important. These areas include the use of polyester resins in tanks which may store chemicals, in ducts, hoods, pipes, stacks, or other chemical processing plant equipment, in building panels used in such plants where exposure to fumes is present or in other structural or decorative applications where chemical or exposure to chemicals would be encountered. This is unfortunate because such applications normally also demand a self-extinguishing resin. Heretofore, the industry has not been able to satisfy both these demands in a single formulation.

It has now been discovered that by using a mixture of dihydric alcohols comprising the butylene oxide adduct of bis-phenol A together with a second dihydric alcohol selected from the class consisting of ethylene glycol and 1,3-butane diol in a polyester, a portion of the maleic acid or anhydride may be replaced by a phthalic compound such as a tetrabromophthalic compound to render the polyester resin self-extinguishing yet also having good chemical resistance.

This was quite surprising because although the ethylene and propylene oxide adducts of bis-phenol A have been previously described for use in polyester resins, these diols do not impart chemical resistance to resins made with tetrabromophthalic anhydride.

It has further been discovered, in accordance with the invention, that certain commonly used dihydric alcohols which, when used separately, provide no chemical resistance to a polyester resin can be used in combination with the butylene oxide adduct of bis-phenol A to produce a resin having good chemical resistance. The particular dihydric alcohols found effective are ethylene glycol and 1,3-butane diol. This is very important due to the cost of these latter two dihydric alcohols in comparison with the butylene oxide of bis-phenol A. Furthermore, it was surprising to discover this because 1,2-propylene diol, another commonly used dihydric alcohol used in the production of polyester resins, when combined with the butylene oxide adduct of bis-phenol A does not produce a polyester resin having good chemical resistance.

SUMMARY OF THE INVENTION

In accordance with the invention, a self-extinguishing, polyester resin having good chemical resistance comprises:

(a) 20–60% by weight of an α,β-ethylenically unsaturated copolymerizable monomer;

(b) 40–80% by weight of an unsaturated polyester produced by condensing in approximately equimolar proportions:

(1) up to 90 mole percent of an unsaturated dicarboxylic acid compound such as maleic acid, maleic anhydride, and fumaric acid; and (2) at least 10 mole percent of tetrabromophthalic acid or its anhydride; with (3) 12–50 mole percent of a butylene oxide adduct of bisphenol A; and (4) 50–88 mole percent of either ethylene glycol or 1,3-butane diol.

DETAILED DESCRIPTION

As previously stated, this invention provides a self-extinguishing polyester resin having good chemical resistance. Unsaturated polyester resins are well known in the art (see, for example, U.S. Pat. 2,255,313 issued to Carleton Ellis). The unsaturated polyester portion is a condensation polymer formed by polyesterifying dicarboxylic or their anhydrides acids with dihydric alcohols. The term "unsaturated polyester" as used herein is defined as the condensation polymer produced by condensing dicarboxylic acid or its anhydride with dihydric alcohol in approximately equimolar proportions and wherein at least a portion of the dicarboxylic compound contains ethylenic unsaturation. The term "unsaturated polyester resin" as used herein is meant to define the combination of:

(a) The condensation polymer or unsaturated polyester;

(b) an α,β-ethylenically unsaturated copolymerizable monomer such as styrene which can be copolymerized with the unsaturated polyester.

To provide unsaturation within the polyester, at least a portion of the dicarboxylic acid or anhydrides must contain ethylenic unsaturation. Examples of such unsaturated dicarboxylic acids include maleic or fumaric acids, as well as the dehydrated equivalent of maleic acid, maleic anhydride. As stated earlier, for chemical-resistant purposes as large a portion as possible of the dicarboxylic acid or anhydrides should be ethylenically unsaturated. However, in accordance with the invention, a portion of the dicarboxylic acid or anhydride is tetrabromophthalic acid or its anhydride. The tetrabromophthalic unlike its chlorinated homologue contains sufficient weight of bromine per mole to impart self-extinguishment to the polyester without deleteriously affecting the chemical resistance by the use of excessive amounts. In contrast, if tetrachlorophthalic anhydride be substituted for the tetrabromophthalic, the polyester resin is rendered self-extinguishing, but the chemical resistance is deleteriously affected. Therefore, in accordance with the invention, at least 10 mole percent, and preferably, not more than 35 mole percent of the dicarboxylic acid or anhydride used in the polyester is tetrabromophthalic acid or tetrabromophthalic anhydride. The remainder (65–90 mole percent) of the dicarboxylic acids are ethylenically unsaturated dicarboxylic acids or anhydrides such as maleic and fumaric as mentioned above. It should be noted, however, that a greater amount of tetrabromophthalic anhydride could be used and the resulting polyester physically mixed with another polyester having good chemical resistance, but containing little or no phthalic based dicarboxylic compounds.

In accordance with the invention, the dicarboxylic acids are polyesterified with approximately equimolar amounts of dihydric alcohols. The mixture of dihydric alcohols used in the polyester resin of the invention to produce a self-extinguishing resin having good chemical resistance contains at least 12 mole percent of the butylene adduct of bis-phenol. A having the formula:

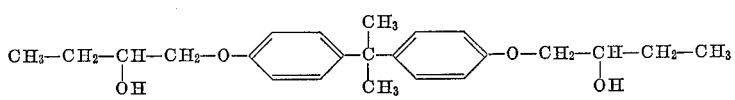

and 50–88 mole percent of either ethylene glycol or 1,3-butane diol. The mole percent of butylene oxide adduct of bis-phenol A preferably is from about 12–50%. Higher amounts are not necessary and therefore, are uneconomical. Therefore, the remainder (50–88 mole percent) of the dihydric alcohols used in accordance with the invention are selected from the class consisting of ethylene glycol and 1,3-butane diol.

The polyester is prepared by polyesterifying the ingredients described above in accordance with well-known procedures for producing condensation resins such as, for example, described in the Carleton Ellis patent previously referred to. The resins may be produced by either the so-called "fusion" or the "solvent" process to a molecular weight which is conveniently measured by the acid number of the polyester. For example, when the esterification is carried out in the so-called fusion process, the esterification is carried out under an inert blanket of gas such as nitrogen in a reaction kettle in a temperature range of 180–220° C. for a period of about 6–20 hours until an acid number below 100 and preferably below 50 is obtained (based on milliequivalents of KOH necessary to neutralize 1 gram of the polyester). Gelation inhibitors such as hydroquinone can be used as well as esterification catalysts to accelerate the condensation.

The resulting polyester is then dissolved and subsequently copolymerized with any of the well-known α,β-ethylenically unsaturated monomers which are used as both solvents and copolymerizable monomers for polyesters. Examples of such monomers include styrene, alpha-methyl styrene, vinyl toluene, divinyl benzene, chlorostyrene, diallyl phthalate, methyl methacrylate and the like as well as mixtures of the above monomers. As mentioned previously, the term "polyester resin" is defined as a polyester dissolved in, or cross-linked with a monomer such as described above. The amount of monomer used varies from 20–60% by total weight of the resin. Preferably about 40–50% is used.

The resin may have fillers such as calcium carbonate, talc or the like added thereto as well as coloring agents. Other fire-retardant additives can also be incorporated into the resin such as antimony oxide or phosphorus or the like which are known to have a synergistic effect when used in halogen-containing polyesters. One well-known phosphorus additive which can be used effectively in the resin of the invention is Phosgard C–22–R which has the formula:

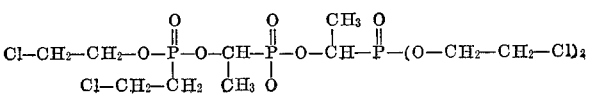

The subsequent copolymerization or curing of the polyester resin is usually initiated by a free radical generating catalyst such as, for example, a peroxide catalyst; although, other free radical generating means such as, for example UV light or radiation can also be used. Examples of such free radical generating catalysts include benzoyl peroxide, cumene hydroperoxide, methyl ethyl ketone peroxide, and the like. Other free radical generating catalysts which can also be used include, for example, 2,2-azobisisobutyronitrile. Polymerization accelerators such as cobalt naphthenate, dimethyl aniline or the like, can also be used in conjunction with the above catalysts.

The invention will be more easily understood by referring to the following examples and the attached flow sheet.

EXAMPLE I

To a reaction kettle, there was charged 2.4 moles tetrabromophthalic anhydride, 7.6 moles of maleic anhydride, 7.5 moles of ethylene glycol, and 2.5 moles of BB-300 diol (a commercially available 1,2-butylene oxide adduct of bis-phenol A). Nitrogen was slowly bubbled through the reactor to prevent oxidation. The ingredients were reacted for 8 hours at a temperature of 205° C. until an acid number of 47 was reached. The polyester was then dissolved into sufficient monomeric styrene to form a 50–50 weight percent ratio of polyester to monomer. The resultant resin was tested for bromine content. The bromine content was found to be 12.5 of the total weight of the resin.

To a portion of this resin was added 4% by weight of Phosgard C-22-R, 1.0 percent by weight of a 60% solution of methyl ethyl ketone peroxide (catalyst), 0.5% of a 6% solution of cobalt naphthenate (accelerator) and 0.1% dimethyl aniline (accelerator). The resin was poured into a tray to a ⅛″ depth where it gelled at room temperature in 20 minutes. The gelled resin was then cut in ½″ by 8″ samples which were cured for 1 hour at 135° C. The samples were tested for chemical resistance and self-extinguishing properties.

The chemical resistance was determined by measuring the initial flexural strength, and flexural modulus and repeating the measurement after immersion of the sample for a stated period of time at 70° C. in the particular chemical. The results are tabulated in terms of the percentage retention of the original characteristics.

The self-extinguishing properties of the resin were measured by subjecting the samples both before and after the chemical exposure through a well-known industrial test known as the HLT–15 rating. This test comprises holding a ⅛″ x ½″ x 8″ specimen vertically in the flame of a Tirrell burner whose axis is 20° from the vertical. The flame height is approximately 5″ with an inner blue cone of 1 and 1½″. The lower edge of the specimen is held at the tip of the inner cone. The specimen is held in the flame and removed according to the following schedule:

| Application | In flame (sec.) | Extinguishment time (sec.) |
| --- | --- | --- |
| First | 5 | 10 |
| Second | 7 | 14 |
| Third | 10 | 20 |
| Fourth | 15 | 30 |
| Fifth | 25 | 50 |

If the specimen extinguishes within the first specified time limit, a rating of 20 is given; with each subsequent successful application, an additional 20 is added. A rating of 100 is, therefore, the maximum obtainable in this test. The physical tests and the self-extinguishing rating of the specimens before and after exposure to various chemical compounds are tabulated below:

TABLE I.—12 MONTHS EXPOSURE AT 70° C.

| Chemical | Initial HLT-15 rating | Percent retention of physical characteristics | | Final HLT-15 rating |
| --- | --- | --- | --- | --- |
| | | Flexural strength | Flexural modulus | |
| 5% $HNO_3$ | 100 | 38 | 74 | 100 |
| 25% $H_2SO_4$ | 100 | 60 | 103 | 100 |
| 15% HCl | 100 | 59 | 86 | 100 |
| 5% NaOH | 100 | 34 | 81 | 100 |
| Distilled $H_2O$ | 100 | 47 | 79 | 100 |
| 5% Electrasol | 100 | 30 | 58 | 80 |
| Clorox | 100 | 32 | 82 | 100 |

The results indicate that the resin of the invention possesses good self-extinguishing and chemical resistant characteristics and further that long chemical exposure does not impair the self-extinguishing characteristics. It should be noted that polyester resins which are not chemically resistant if exposed to the severe conditions above (i.e., 12 months immersion at 70° C.) would be virtually destroyed and would in most cases have no physical integrity much less any percentage of original physical properties remaining. It is also therefore particularly significant that after such a severe test almost every specimen retained its high self-extinguishing rating as well.

EXAMPLE II 2.3 moles of tetrabromophthalic anhydride, 7.7 moles of maleic anhydride, 8.7 moles of 1,3-butane diol and 1.3 moles of BB–300 diol were charged to a nitrogen purged reactor and esterified at a temperature of 210° C. for 9 hours until an acid number of 40 was reached. The polyester was then dissolved in a styrene-divinyl benzene solution having a 1:1 monomer ratio to a 60% polyester-40% monomer weight ratio. The percentage of bromine in the resin was measured to be 15. Samples were prepared from this resin as in Example I. The HLT–15 self-extinguishing rating of the resin was measured at 100. The samples were then subjected to 7 days reflux in $H_2O$, and 10% sodium hydroxide. At the end of this period, the percentage weight change was measured and tabulated below:

TABLE II

Percent weight change $H_2O$ —————————————————————————— —0.9
10% NaOH —————————————————————— —0.3

The HLT–15 rating after exposure was, in each case, again 100.

The results indicate that the physical properties of the polyester resin are not substantially impaired by the exposure to various chemicals as is normally encountered with non-chemically resistant polyester resins. The HLT–15 rating both before and after exposure shows the polyester resins to have excellent self-extinguishing characteristics and furthermore, that these characteristics are not lost by chemical exposure.

The foregoing has described a novel polyester resin composition which has excellent chemical resistance properties yet is also self-extinguishing. The resin, therefore, is useful in many applications where both chemical resistance and self-extinguishing characteristics are essential.

What is claimed is:

1. A chemically resistant, self-extinguishing polyester resin comprising:
   (a) 20–60% by weight of an $\alpha,\beta$-ethylenically unsaturated copolymerizable monomer; with
   (b) 40–80% by weight of an unsaturated polyester produced by condensing in approximately equimolar proportions:
      (1) up to 90 mole percent of an unsaturated dicarboxylic acid compound selected from the group consisting of maleic acid, maleic anhydride, and fumaric acid; and
      (2) at least 10 mole percent of a tetrabrominated phthalic acid or anhydride; and (3) 12–50 mole percent of the butylene oxide adduct of bis-phenol A having the formula:

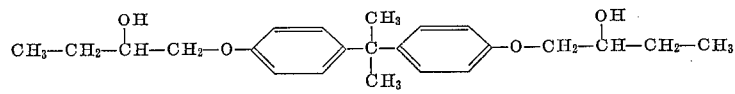

and (4) 50–88 mole percent of a dihydric alcohol selected from the class consisting of ethylene glycol and 1,3-butane diol.

2. The polyester resin of claim 1 wherein said dihydric alcohol is ethylene glycol.

3. The polyester resin of claim 1 wherein said dihydric alcohol is 1,3-butane diol.

4. The polyester resin of claim 1 wherein said $\alpha,\beta$-ethylenically unsaturated monomer is styrene.

References Cited

UNITED STATES PATENTS 2,902,518  9/1959  Hurdis et al. _____ 260—613
3,285,995  11/1966  Nametz et al. _____ 260—865

HAROLD D. ANDERSON, Primary Examiner

M. GOLDSTEIN, Assistant Examiner

U.S. Cl. X.R.

260—40, 47, 75, 863, 865